United States Patent [19]

Buckell

[11] 4,123,836
[45] Nov. 7, 1978

[54] MACHINE HAVING FLUID PASSAGES

[75] Inventor: Raymond A. Buckell, Maidenhead, England

[73] Assignee: Buckell Engineering Company, Limited, Berkshire, England

[21] Appl. No.: 714,511

[22] Filed: Aug. 16, 1976

Related U.S. Application Data

[63] Continuation of Ser. No. 452,842, Mar. 20, 1974, abandoned.

[30] Foreign Application Priority Data

Mar. 23, 1973 [GB] United Kingdom ............ 14142/73

[51] Int. Cl.$^2$ .............................................. B23P 15/00
[52] U.S. Cl. ........................... 29/156.4 WL; 29/527.1; 264/263
[58] Field of Search ............. 29/156.5 R, 156.4 R, 29/156.4 WL, 527.1, 527.5; 264/263, 271, 275, 279; 285/297, 284; 92/169, 261, 146, 147, 148, 149

[56] References Cited

U.S. PATENT DOCUMENTS

| 1,693,520 | 11/1928 | Kondo | 29/156.4 WL |
|---|---|---|---|
| 2,239,853 | 4/1941 | Louree | 92/261 |
| 2,331,554 | 10/1943 | Irgens | 29/156.4 WL |
| 2,367,809 | 1/1945 | Stein et al. | 264/271 |
| 2,729,198 | 1/1956 | Faccou | 92/169 |
| 3,000,370 | 9/1961 | Kunzog | 123/193 C |
| 3,107,133 | 10/1963 | Smith | 264/271 |
| 3,191,655 | 6/1965 | McCord | 264/261 |
| 3,458,619 | 7/1969 | Prochaska | 264/263 |
| 3,683,960 | 8/1972 | Kirsch | 264/277 |
| 3,732,606 | 5/1973 | de Germond | 29/527.1 |
| 3,789,094 | 1/1974 | Hutchison | 264/277 |

FOREIGN PATENT DOCUMENTS

| 936,821 | 12/1955 | Fed. Rep. of Germany | 29/156.4 R |
|---|---|---|---|
| 716,101 | 9/1954 | United Kingdom | 29/527.1 |

*Primary Examiner*—C.W. Lanham
*Assistant Examiner*—Daniel C. Crane
*Attorney, Agent, or Firm*—Oblon, Fisher, Spivak, McClelland & Maier

[57] ABSTRACT

This invention is a method of making a fluid pump or an engine in which passages for the working fluid are defined by metal sleeves which are held together by being entirely embedded in a surrounding casing of an epoxy resin containing glass spheres as a filler to give dimensional stability and strength.

1 Claim, 2 Drawing Figures

MACHINE HAVING FLUID PASSAGES

This is a continuation of application Ser. No. 452,842 filed Mar. 20, 1974, now abandoned.

This invention relates to machines for example, fluid pumps and internal combustion engines or other machines using a working fluid. At present such machines use metal castings for defining the various fluid passages and such castings are expensive especially in respect of the considerable machining that is required. Moreover castings very often have blow holes or other irregularities which create difficulties in manufacture and it is an object of the present invention to provide a construction of such a machine which avoids some of these difficulties.

According to the present invention in a machine passages for the flow of fluid are defined by a number of components which are held together in their passage-defining relationship by being embedded within a surrounding molded casing.

The casing may be of an epoxy resin or other thermosetting plastics material and conveniently is one which includes glass or steel spherical or other filler particles to give it rigidity and strength and low shrinkage. The passage-defining components may be for example, of stainless steel, or titanium, or other metals, but they can be of simple form and frequently in the form of standard tubes which merely require machining as to diameter and length as by operation of a lathe or a borer so that the complicated machining of a complete casting is avoided. What is more, such components that are made from metal tube are of course not made from castings so that the difficulties of irregularities in the material are also avoided.

If necessary different components can be embedded in different part-castings which part-castings can then be bolted or otherwise fixed together to hold the components in their passage defining relationship.

The invention includes the method of making such a machine in which components defining passages for the flow of fluid in the machine are located in a mold, and a casting is molded around them to hold them in relationship with each other.

The invention may be carried into practice in various ways and one embodiments will now be described by way of example, with reference to the accompanying drawings, in which.

Figure 1:
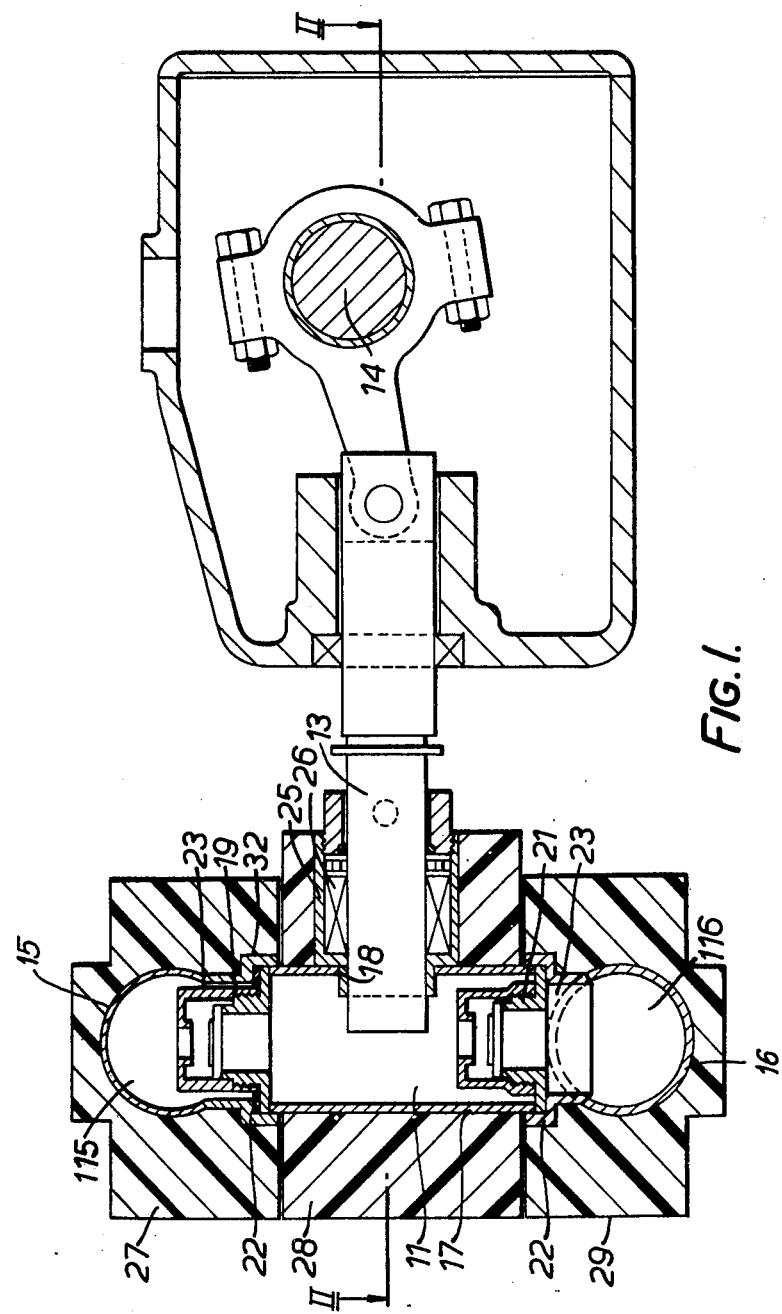
FIG. 1 shows a sectional elevation of a fluid pump embodying the invention.
Figure 2:
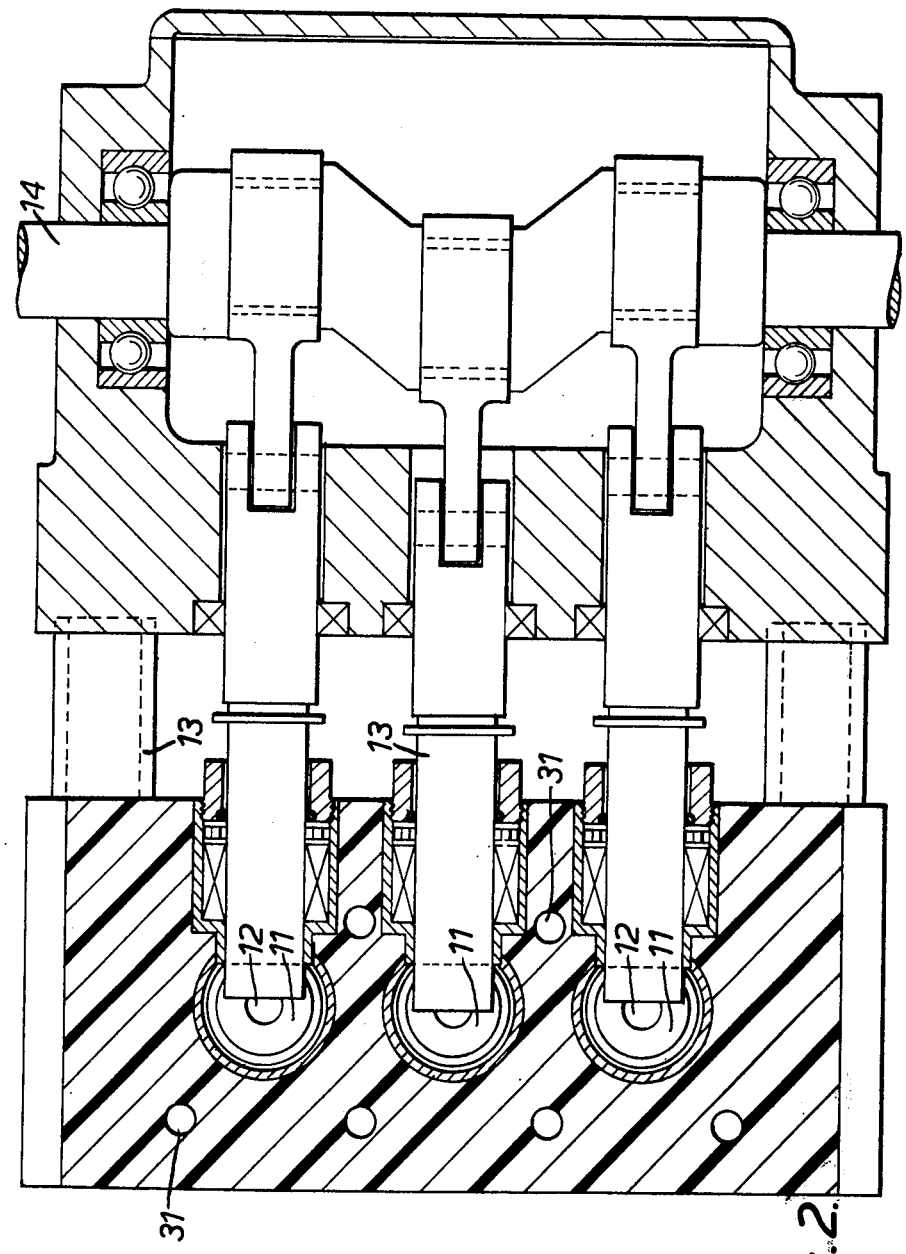
FIG. 2 is a section on the line II—II in FIG. 1.

The pump comprises three cylinders 11 on parallel axes 12 each of which has a piston 13 arranged to be reciprocated radially in relationship to the cylinder 11 by a driving shaft 14. The pistons 13 are driven with a 120° phase shift between them so that the cylinders provide pressure fluid reasonably continuously to a fluid outlet passage 115. Fluid is drawn into each cylinder 11 on the suction stroke of its piston 13 from an inlet passage 116 which is common to all three cylinders 11.

FIG. 1 shows that each cylinder 11 consists of a stainless steel cylindrical sleeve 17 having a radial bore 18 for the piston 13. At each end of the sleeve 17 is an automatic spring-loaded one-way valve arranged as an outlet valve 19 at the connection to the passage 115 and arranged as an inlet valve 21 at the connection to the passage 116. The piston 13 slides in a sleeve 25 which fits into the bore 18 in each sleeve 17 and contains a conventional seal 26.

The sleeve 25 is machined from standard tube and so are the components 15 and 16 defining the inlet and outlet passages 115 and 116.

The pump casing is made in three separate parts 27, 28 and 29 which are eventually bolted together to hold the pump in assembly by bolts passing through bolt holes 31.

Each part-casing is made in a similar manner in that the components each contains, for example, the component 15 and the end sleeve 22 in the part-casing 27, are positioned in a mold which is then filled with a glass-ball filled epoxy resin, which when cured forms the body 27 in which the components are embedded. The components such as 15 and 22 are thus held together in their passage-defining relationship merely by both being embedded in the same molded plastics part-casing.

In a similar manner the sleeves 17 and 25 are assembled together by being embedded in the part-casing 28, and the components 22 and 16 are held assembled together by being embedded in the part-casing 29. The valves 19 and 21 are fitted at the ends of the sleeve 17 together with seals 32, if required, after which the three part-casings are bolted together to complete the assembly.

The plastics material described is strong and provides reinforcement against bursting loads in the passages so that the metal sleeves thus can be thinner than if they had to carry a full pressure themselves.

Thus expensive metals can be used most economically and since they are all of simple cylindrical tubular form there is a minimum of machining.

It has been found that a pump of this kind can be made at substantially lower cost than the equivalent pump made by machining a one piece casting, and there is an additional advantage that the fluid passages are all defined by components made from tubular material.

The particular pump described is for pumping water to be desalinated in reverse osmosis equipment and can operate at a flow rate of 5 gallons per minute delivering fluid at a pressure of 1250 lbs per square inch.

The invention is equally applicable to other machines, for example, internal combustion engines where the cylinders and valve passages and interconnections would be defined by similar simply machined hollow cylindrical components.

A sealing compound can be disposed at the joints between the components, and it will be seen that the fluid can flow through passages defined entirely by the component material, so that there can be no contamination.

In one example, the various components of one pump sub-assembly were grit blasted on the external surfaces, care being taken to protect their internal surfaces by masking tapes.

They were then assembled in correct alignment in a demountable mold. 200 grams of a commercial eposcide resin (Araldite F) were mixed with 64 grams of a liquid hardener which is essentially 4.4 diamino diphenyl methane. The mixture was heated to 60° C. and outgassed using appropriate vacuum techniques.

900 grams of solid glass microspheres in the size range 400–500 microns were combined with 200 grams of glass microsphres in the size range 30–60 microns to achieve bimodal packing and the mixture heated to 80° C.

The resin hardener mixture at 60° C. was then added to the warm glass heads, the mixture outgassed by vacuum and poured round the pump assembly mounted in the mold. The mold was then placed in an oven and cured at 120° C. for 1 hr.

The mould was removed from the oven, cooled, and dissassembled to remove the molded pump sub-assembly and the sub-assembly was post-cured for 4 hours at 180° C.

If desired the molding material could include carbon, glass, or other, fiber reinforcement, particularly around the holes 31. Also the moulded casing could be externally protected by sheet metal or metal angle at vulnerable points.

I claim:

1. A method of making a machine comprising the steps of:

non-fixedly mating together first and second components so as to define therebetween a passage for the flow of fluid within said machine, each of said components having an internal surface constituting a wall of said passage;

disposing said non-fixed mated componets within a mold;

molding a casing about substantially the entire external surface area of said components so as to fixedly secure said components together, the casing thickness being substantially greater than the wall thickness of the components, whereby said components are fixedly secured together solely by said molded casing so as to define said fluid passage solely by said components and not by the material of said molded casing, and whereby all of the components walls are reinforced by the casing material wherein a number of part-casings are made and the part-casings are secured together to hold the components in each in passage-defining relationship with each other.

* * * * *